(12) United States Patent
Haskett et al.

(10) Patent No.: US 7,291,359 B2
(45) Date of Patent: *Nov. 6, 2007

(54) METHOD AND APPARATUS FOR MAKING AN ADHESIVE CLEANING SHEET

(75) Inventors: Thomas E. Haskett, Oakdale, MN (US); Kim C. Sachs, White Bear Lake, MN (US); Randy L. Moseng, Hugo, MN (US); Ronald E. Bergsten, Minneapolis, MN (US)

(73) Assignee: 3M Innovative Properties Company, St. Paul, MN (US)

( * ) Notice: Subject to any disclaimer, the term of this patent is extended or adjusted under 35 U.S.C. 154(b) by 147 days.

This patent is subject to a terminal disclaimer.

(21) Appl. No.: 10/920,953

(22) Filed: Aug. 18, 2004

(65) Prior Publication Data

US 2006/0037692 A1 Feb. 23, 2006

(51) Int. Cl.
*B05D 5/10* (2006.01)
*B05D 1/28* (2006.01)

(52) U.S. Cl. .............. 427/208.6; 427/256; 427/428.06; 427/210; 427/211

(58) Field of Classification Search ............. None
See application file for complete search history.

(56) References Cited

U.S. PATENT DOCUMENTS

| | | |
|---|---|---|
| 4,737,559 A | 4/1988 | Kellen et al. |
| 5,057,366 A | 10/1991 | Husman et al. |
| 5,662,758 A | 9/1997 | Hamilton et al. |
| 5,670,110 A * | 9/1997 | Dirk et al. ............ 264/504 |
| 5,753,768 A | 5/1998 | Ellis |
| 2002/0171168 A1* | 11/2002 | McGuire et al. ......... 264/167 |
| 2003/0171051 A1 | 9/2003 | Bergsten et al. |
| 2004/0091701 A1* | 5/2004 | Toussaint et al. ......... 428/343 |
| 2004/0099388 A1* | 5/2004 | Chen et al. ............ 162/134 |
| 2004/0134596 A1* | 7/2004 | Rosati et al. ............ 156/230 |

FOREIGN PATENT DOCUMENTS

| | | |
|---|---|---|
| EP | 1078968 A | 2/2001 |
| WO | WO 00/56828 | 9/2000 |
| WO | WO 01/80705 A2 | 11/2001 |

OTHER PUBLICATIONS

*Handbook of Pressure-Sensitive Adhesive Technology*, 2nd ed., Chapter 13, D. Satas, Editor, Van Nostrand Reinhold, Publisher, NY 1989.

(Continued)

*Primary Examiner*—William Phillip Fletcher, III
*Assistant Examiner*—Cachet I Sellman
(74) *Attorney, Agent, or Firm*—Trish D. Adamson (57) ABSTRACT

A method of selectively applying pressure-sensitive adhesive to a nonwoven web and thereby forming a cleaning sheet having adhesive free peaks and adhesive containing valleys includes coating an adhesive transfer roll with adhesive, transferring a portion of the adhesive to raised regions of a female pattern forming roll, separating the adhesive between the adhesive transfer roll and the female pattern forming roll, and transferring the adhesive from the raised regions of the female pattern forming roll to the web. An apparatus for selectively applying pressure-sensitive adhesive to a nonwoven web and forming a cleaning sheet is also described.

27 Claims, 2 Drawing Sheets

OTHER PUBLICATIONS

*Handbook of Pressure-Sensitive Adhesive Technology*, 2nd ed., Chapter 16, p. 473, D. Satas, Editor, Van Nostrand Reinhold, NY, 1989.

*Emulsion Polymerization and Emulsion Polymers*, Chapter 13, p. 455, P. Lovell and M. El-Aasser, Editors, John Wiley and Sons, NY, 1997.

* cited by examiner

METHOD AND APPARATUS FOR MAKING AN ADHESIVE CLEANING SHEET

FIELD

The present invention relates generally to cleaning sheets and, more particularly, to a method and apparatus for making a cleaning sheet having peaks and valleys with adhesive in the valleys.

BACKGROUND

Cloths, cleaning sheets, and other wiping products are known and methods for making such products are also known. PCT Publication Number WO 01/80705, for example, describes a cleaning sheet with particle retaining cavities. The cleaning sheet is produced by coating a nonwoven backing layer with an adhesive, followed by lamination of an apertured nonwoven onto the adhesive layer.

This and other methods for producing wipes tend to suffer from one or more disadvantages. The above method, for example, does not selectively coat adhesive in specific locations where it is needed and therefore uses an unnecessary amount of adhesive. Accordingly it would be useful to provide a new method that overcomes those disadvantages, and the industry is continually seeking improved methods for producing cleaning sheets that allows such sheets to be produced more quickly, more precisely, and more cost effectively.

SUMMARY OF THE INVENTION

It would therefore be desirable to provide an improved method and apparatus for producing adhesive cleaning sheets that allows the cleaning sheets to be produced more quickly, precisely, and cost effectively. In particular, it would be desirable to provide an improved method and apparatus for producing adhesive cleaning sheets having a contoured surface with peaks that are essentially free of adhesive and valleys that contain adhesive.

The invention overcomes the limitations in the field by providing a method of selectively applying adhesive to a sheet in precise locations where it is desired. The method comprises the steps of applying a layer of adhesive to a first surface, transferring the adhesive to a portion of a second surface, and transferring at least a portion of the adhesive from the second surface to the sheet. In a more specific aspect, the present invention provides a method of selectively applying pressure-sensitive adhesive to recessed regions of a nonwoven web to produce a cleaning sheet.

In certain more specific aspects of the invention, the first surface may be the outer surface of an adhesive transfer roll, and the adhesive may be an acrylate pressure-sensitive adhesive. In addition, the adhesive may be applied to the outer surface of the adhesive transfer roll in an elongated bead, and the method may further include the step of spreading the bead of pressure-sensitive adhesive over the entire outer surface of the adhesive transfer roll to a uniform and constant thickness ranging from about 1 to about 7 mils. In one embodiment, the adhesive is spread using a blade arranged adjacent the outer surface of the adhesive transfer roll.

In other aspects of the invention, the pressure-sensitive adhesive may be transferred from the adhesive transfer roll to the second surface by contacting the adhesive or the adhesive transfer roll with the second surface, and the second surface may be the outer surface of a female pattern forming roll having a raised surface region and a recessed surface region.

In still other aspects, the raised surface region may comprise a continuously interconnected surface, the recessed surface region may comprise a plurality of discrete depressions or cavities separated by the raised surface region, the pressure-sensitive adhesive may be transferred to only the raised surface region of the female pattern forming roll and the bottom of the recessed surface region remains essentially adhesive free, the adhesive transfer roll and female pattern forming roll may be heated to, and maintained at, a temperature of at least 200° F., the pressure-sensitive adhesive applied to the adhesive transfer roll may have a viscosity of no greater than 200,000 centipoise at 200° F., and the web may be a nonwoven web that may be a spunlace web formed of polyester and rayon fibers.

In another embodiment, the method further includes the step of providing a male pattern forming roll adjacent the female pattern forming roll having protrusions that mate with the recesses of female pattern forming roll. In a particular aspect of the invention, the nonwoven web is conveyed between the male and female pattern forming rolls at a speed corresponding to the speed of the speed of the male and female pattern forming rolls, thereby forming a contoured web having peaks that are essentially free of adhesive and valleys having adhesive coated therein.

In additional aspects, the adhesive may be coated on the web at a weight of about 1 to about 12 grams/m², the recesses of the female pattern forming roll may have a depth of about 1 to about 4 millimeters, the distance between the centers of adjacent peaks of the male pattern forming roll may range from about 5 millimeters to about 20 millimeters, the surface area of the raised surface region may comprise at least 50% of the total outer surface area of the female pattern forming roll, the raised surface region may be in the form of a continuous rectilinear array, and the web may be conveyed between the male and female pattern forming rollers at a speed of at least 25 feet/minute.

In a specific embodiment, the present invention provides a continuous process for selectively applying pressure-sensitive adhesive to recessed regions of a nonwoven web or to a method of forming a cleaning sheet having peaks and valleys with pressure-sensitive adhesive selectively applied to only the valleys from a generally planar web of nonwoven material by applying an elongated bead of pressure-sensitive adhesive to the outer surface of a rotating adhesive transfer roll, spreading the pressure-sensitive adhesive to evenly distribute the pressure-sensitive adhesive on the outer surface of the adhesive transfer roll, thereby forming a continuous uniform layer of adhesive having a constant thickness on the outer surface of the adhesive transfer roll, rotating the adhesively coated outer surface of the adhesive transfer roll into contact with a female pattern forming roll having raised surface regions and recessed surface regions, thereby to transfer adhesive from the adhesively coated outer surface of the adhesive transfer roll to the raised surface regions of the female pattern forming roll without transferring adhesive to the recessed surface regions, rotating the adhesively coated raised surface regions of the female pattern forming roll to mesh with a mating male pattern forming roll, and conveying a generally planar nonwoven web of material between the male and female pattern forming rolls, thereby simultaneously forming a contoured web having peaks and valleys and transferring adhesive to the valleys without transferring adhesive to the peaks.

In another aspect, the present invention provides an apparatus for selectively applying adhesive to a web. The apparatus comprises an adhesive transfer roll having an outer surface, an adhesive applicator arranged to apply an elongated bead of pressure-sensitive adhesive to the outer surface of the adhesive transfer roll, a female pattern forming roll having a raised surface region and recessed regions arranged to contact the adhesive transfer roll and thereby transfer adhesive from the adhesively coated outer surface of the adhesive transfer roll to the raised surface region of the female pattern forming roll without transferring adhesive to the bottom of the recessed regions, a male pattern forming roll arranged in mating relation with the female pattern forming roll, wherein the male pattern forming roll has protrusions that mesh with the female pattern forming roll recessed regions, and a conveyor for conveying a generally planar nonwoven web of material between the male and female pattern forming rolls.

The apparatus may further include a spreader arranged to spread the pressure-sensitive adhesive evenly on the outer surface of the adhesive transfer roll, thereby forming a continuous and uniform layer of adhesive having a constant thickness on the outer surface of the adhesive transfer roll. In a specific embodiment, the spreader is a blade arranged adjacent the outer surface of the adhesive transfer roll.

In various additional aspects, the recesses of the female pattern forming roll may have a depth of about 1 to about 4 millimeters, the distance between adjacent peaks of the male pattern forming roll may range from about 5 millimeters to about 20 millimeters, the surface area of the raised surface region may comprise at least 50% of the total outer surface area of the female pattern forming roll, and the raised surface region may be in the form of a continuous rectilinear array.

An advantage of certain embodiments of the invention is that the adhesive may be coated on the web simultaneously with forming the contoured topography of the web. That is, the adhesive can be applied to the web and the contour of the web can be done in a single step. In previous methods in which the web was contoured topography was formed in a first step and the adhesive was applied in a subsequent step, there was a need for precise control of the web. Because webs generally exhibit some extensibility, this precise control is difficult to achieve. In addition, the present invention selectively coats the web with adhesive only in the locations where it is needed. Accordingly, less adhesive is used and the overall cost of processing the web is reduced.

BRIEF DESCRIPTION OF THE DRAWINGS

The present invention will be further described with reference to the accompanying drawings, in which.

DETAILED DESCRIPTION

Figure 1:
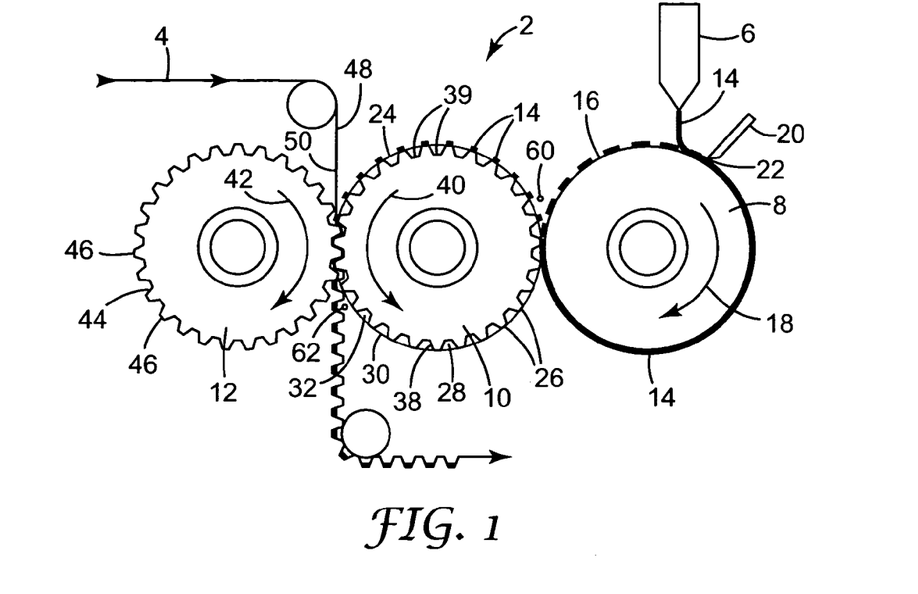
FIG. 1 is a schematic representation of an apparatus according to the invention for selectively applying adhesive to a web and making a cleaning sheet.
Figure 4:
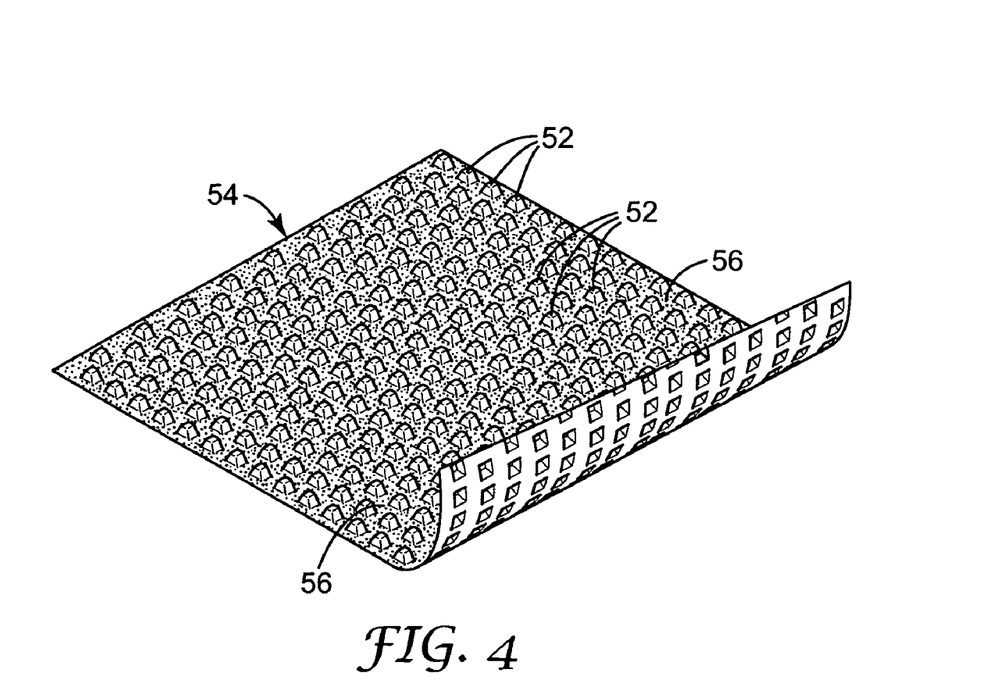
FIG. 4 is a perspective view of a cleaning sheet made according to the method and apparatus of the invention.

Referring now to the drawings, wherein like reference numerals refer to like or corresponding parts throughout the several views, FIG. 1 shows an apparatus 2 for selectively applying pressure-sensitive adhesive to a web of nonwoven material 4 and thereby forming a cleaning sheet 54 (FIG. 4) having valleys 56 that contain adhesive and peaks 52 that are essentially free of adhesive.

The apparatus 2 generally includes an adhesive applicator 6, an adhesive transfer roll 8, a female pattern forming roll 10, and a male pattern forming roll 12. In the illustrated embodiment, the adhesive applicator 6 dispenses a continuous bead of adhesive 14 onto the outer surface 16 of the adhesive transfer roll 8. The adhesive transfer roll 8 rotates clockwise as indicated by arrow 18.

In the illustrated embodiment, a doctor blade 20 is provided adjacent the outer surface 16 of the adhesive transfer roll 8 to spread the bead of adhesive 14 uniformly over the entire outer surface 16 of the adhesive transfer roll 8. The blade 20 evenly distributes the adhesive 14 and produces a smooth adhesive layer having a generally uniform and constant thickness. Alternatively, the adhesive may be coated in a discontinuous fashion or coated to a variable thickness.

The desired thickness of the adhesive 14 will depend on the intended end use application for the web and on the geometry of the male 12 and female 10 pattern forming rolls. The thickness of the adhesive 14 generally ranges from a minimum of about 1 mil and, more particularly, at least about 2 mils to a maximum of no greater than about 7 mils and, more particularly, no more than 5 mils. In a specific embodiment, the adhesive is coated to a thickness of approximately 3 mils. The gap 22 between the doctor blade 20 and the outer surface 16 of the adhesive transfer roll 8 may be adjusted to control the thickness of the adhesive layer on the adhesive transfer roll 8.

Other known methods of applying adhesive to the outer surface 16 of the adhesive transfer roll 8, such as spraying adhesive directly on the outer surface 16 of the adhesive transfer roll 8, using a gravure coating process to coat the outer surface 16 of the adhesive transfer roll with adhesive, or rotating the adhesive transfer roll 8 through a trough of adhesive and removing excess adhesive may also be used and are considered within the scope of the present invention. In addition, the adhesive may be applied in stripes using known pattern coating techniques to produce adhesively coated and non-adhesively coated regions.

Figure 3:
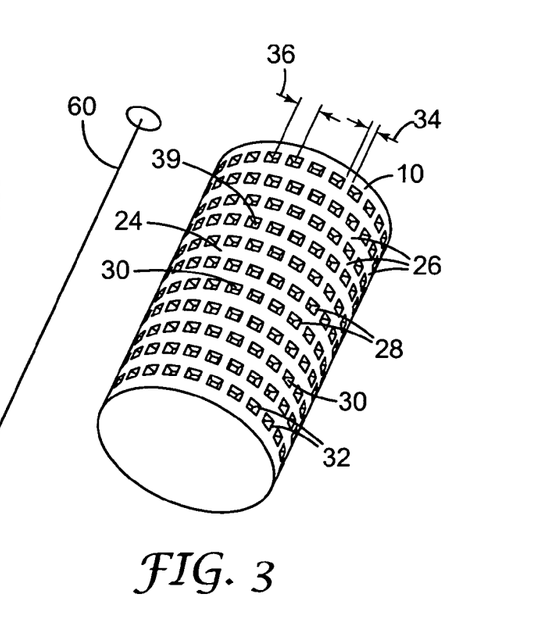
FIG. 3 is a perspective view of the female pattern forming roll of FIG. 1.

The adhesive transfer roll 8 is arranged to rotate into contact with the female pattern forming roll 10. Referring to FIGS. 1 and 3, the female pattern forming roll 10 includes an outer surface 24 having an elevated or raised surface region 26 and a recessed surface region 28 defined by a plurality of discrete indentations, depressions, cavities, or recesses 30. It will be recognized that the raised surface region 26 and recessed surface region 28 of female pattern forming roll 10 outer surface 24 may be come in a wide variety of patterns depending on the desired adhesive coating pattern to be provided on the web 4 and desired topography for the processed web.

In the illustrated embodiment, the raised surface region 26 is a continuously interconnected surface. That is, the entire raised surface region 26 is a lattice that forms a single patterned surface. The raised surface region 26 surrounds the individual recesses 30. The raised surface region 26 comprises approximately 66% of the total outer surface area 24 of the female pattern forming roll 10. Stated another way, the ratio of the area of the raised surface region 26 to the combined area of the openings 32 of the recesses 30 is approximately 2:1.

In the illustrated embodiment, the recesses 30 are discrete depressions or cavities having an inverted frusto-pyramidal shape. Each recess 30 is separated by the raised surface region 26. The opening 32 of each recess 30 (which corresponds to the base of the inverted frusto pyramid) has a minimum cross-sectional area of at least about 5 millimeters (mm$^2$), more particularly, at least 10 mm$^2$, and a maximum cross-sectional area of no greater than about 25 mm$^2$, more particularly no greater than about 20 mm$^2$. In a particular embodiment, the opening 32 has a cross-sectional area of approximately 15 square millimeters (mm$^2$). The recess 30 has a minimum depth 38 (which corresponds to the height of the inverted frusto-pyramid) of at least about 0.5 millimeters (mm), more particularly at least about 0.8 mm, and even more particularly, at least about 1.5 mm, and a maximum depth of no greater than about 5 mm, more particularly, no greater than about 4 mm, and even more particularly, no greater than bout 3.5 mm. In a particular embodiment, the recess 30 has a depth 38 of approximately 3 mm.

The circumferential distance 34 between adjacent recesses 30 is at typically at least about 4 mm, more typically at least about 6 mm, and even more typically, at least about 7 mm, and typically no greater than about 12 mm, more typically, not greater than about 10 mm, and even more typically, no greater than about 9 mm. In a particular embodiment, the circumferential distance 34 between adjacent recesses 30 is approximately 8 mm, and the circumferential distance 36 between the centers of adjacent recesses 30 is approximately 12 mm. The recesses 30 may have a wide variety of cross sections such as, for example, circles, squares, triangles, ovals, or diamonds. In addition, the side surfaces of the recesses may be sloped (or tapered) inwardly in the direction away from the openings 32 as illustrated in FIGS. 1 and 3, or the side surfaces may be parallel.

When the adhesive transfer roll 8 and female pattern forming roll 10 rotate into contact, adhesive 14 is transferred from the outer surface 16 of the adhesive transfer roll 8 to the raised surface region 26 of the female pattern forming roll 10. Some adhesive may be transferred to the sloping side surfaces of the recess 30 but essentially no adhesive is transferred to the bottoms 39 of the recesses 30. The outer surface 24 of the female pattern forming roll 10 is designed so that the adhesive 14 is transferred to the raised surface region 26 but is not transferred into the bottom 39 of the recesses 30. This is accomplished by selecting a suitable adhesive, adjusting or controlling the visco-elastic properties of the adhesive, controlling the thickness of the adhesive layer 14 coated onto the adhesive transfer roll 8, and designing the recesses 30 on the female pattern forming roll 10 to have a sufficiently large cross-sectional opening area 32 and depth 38 to prevent adhesive 14 from being transferred into the bottom 39 of the recesses 30.

The particular adhesive is not critical to the invention so long as a generally uniform layer of adhesive can be transferred from the adhesive transfer roll 8 to the raised surface region 26 of the female pattern forming roll 10.

Suitable adhesives include any that are capable of being tacky at room temperature, including both adhesives that are initially tacky and those that are initially non-tacky but which can be activated to become tacky. Suitable adhesives include any pressure-sensitive adhesives, including materials based on acrylates, silicones, poly-alpha-olefins, polyisobutylenes, rubber block copolymers (such as styrene/isoprene/styrene and styrene/butadiene/styrene block copolymers), styrene butadiene rubbers, synthetic isoprenes, natural rubber, and blends thereof. The pressure-sensitive adhesives may be coated from solvent, from water, radiation polymerized, or hot melt processed. These pressure-sensitive adhesives may or may not be crosslinked. Crosslinking can be done by well-known methods, including chemical, ionic, physical, or radiation-induced processes. To improve the cohesive strength of the adhesive once deposited into the valleys of the wiping member, some crosslinking may be used.

To allow for low viscosity for easy processing while providing for good cohesive strength, adhesives with physical crosslinking, ionic crosslinking, or some form of post-crosslinking are preferred. Post-crosslinking can be carried out by exposing the adhesive to radiation, such as electron-beam or high intensity ultraviolet (UV) radiation. For UV crosslinking, it may be desirable to incorporate a photo-receptive group into the polymer backbone to facilitate the crosslinking reaction.

U.S. Pat. No. 4,737,559 (Kellen et al.) discloses examples of such UV-crosslinked adhesives. Physical or ionic crosslinking provide the advantage that the process is thermally reversible, making it particularly preferred for hot-melt processing. Physically crosslinked adhesives include those based on rubber block copolymers. Examples of synthetic rubber block copolymers include Kraton™ commercially available from Kraton Polymers of Houston, Tex., and Vector™ commercially available from Exxon-Mobil of Houston, Tex. These block copolymers are typically formulated into pressure-sensitive adhesives by compounding them with tackifiers and/or oils. Details about the formulation of these types of adhesives can be found in the Handbook of Pressure Sensitive Adhesive Technology, Second Edition, chapter 13 (D. Satas editor, Van Nostrand Reinhold publisher, N.Y.) Other physically crosslinked adhesives include macromer grafted polymers as disclosed in U.S. Pat. No. 5,057,366 (Husman et al.).

The adhesives useful in this invention may be tacky under both dry and wet conditions. Adhesives with high tack under wet conditions are disclosed in a PCT Publication Number WO 00/56828. The pressure-sensitive adhesives may also be coated from water in the form of a latex or dispersion. As discussed in the Handbook of Pressure-Sensitive Adhesive Technology $2^{nd}$ edition (D. Satas editor, Van Nostrand Reinhold, N.Y., 1989), these adhesives may be based on polymers like natural rubber, acrylates, styrene-butadienes, and vinyl ethers. Especially when coated directly on a porous, woven, or nonwoven substrate, the neat latex adhesives may not be viscous enough to prevent excessive penetration into the substrate. Whereas the viscosity and flow of the latex adhesive may be controlled by the solids content of the material, it may be more beneficial to formulate the latex with thickening agents. Thickening agents are typically categorized as water-soluble polymers or associative thickeners. Their nature and mechanism of operation are described in Emulsion Polymerization and Emulsion Polymers, chapter 13, page 455 (P. Lovell and M. El-Aasser editors, John Wiley and Sons, NY, 1997). As discussed in the Handbook of Pressure-Sensitive Adhesive Technology $2^{nd}$ edition, chapter 16, page 473 (D. Satas editor, Van Nostrand Reinhold, NY, 1989), in the case of pressure-sensitive adhesives, particular care has to be taken in the selection of the thickening agent so it does not interfere with the adhesive properties.

A suitable adhesive is a 95% iso-octyl acrylate, 5% acrylic acid hot melt pressure-sensitive adhesive. Such adhesives are described in U.S. Pat. No. 5,753,768.

To control the viscosity and improve the transfer of the adhesive between the adhesive transfer roll 8 and the raised surface region 26 of the female pattern forming roll 10, the adhesive transfer roll 8 and female pattern forming roll 10 are heated. In certain embodiments, the adhesive transfer roll 8 and female pattern forming roll 10 are maintained at a temperature of at least about 200° F., more particularly at least about 250° F., and most particularly at least about 300° F.

Heating the adhesive transfer roll 8 and female pattern forming roll 10 reduces the formation of adhesive "strands" (not shown) that may stretch between the adhesive transfer roll 8 and the female pattern forming roll 10 during the coating process, which may form for certain adhesives at high processing speeds. The formation of adhesive strands depends on a number of factors including the type of adhesive being transferred, the coating weight of the adhesive, the processing speed (i.e. the rotational speed of the adhesive transfer roll 8 and the female pattern forming roll 10. In addition, the formation of adhesive strands can be controlled by adjusting the coating weight of the adhesive, adjusting the line speed, adjusting the temperature and viscosity of the adhesive, or by adding additives and fillers to the adhesive. The adhesive strands may cause adhesive to be inadvertently transferred into the bottoms 39 of the recesses 30.

The adhesive 14 preferably has a minimum viscosity of about 4000 centipoise (cps), more particularly, at least about 10,000 cps, and most particularly, at least about 25,000 cps, and a maximum viscosity of no greater than about 200,000 cps, more particularly, no greater than about 150,000 cps, and most particularly, no greater than about 100,000 cps at the applied temperature.

An adhesive separating element 60 is arranged between the adhesive transfer roll 8 and the female pattern forming roll 10 to break or cut any strands of adhesive that may form in the region between the adhesive transfer roll 8 and the female pattern forming roll after the adhesive transfer roll 8 and female pattern forming roll 10 have been rotated into contact and then begin to separate. The adhesive separating element 60 may be, for example, a heated wire, an ultrasonic device, a laser, a high pressure water jet, or a high pressure air stream. To maximize the likelihood that any stands will be cut in a controlled manner by the adhesive separating element 60, the element 60 is located as close as possible to the location where the surfaces of the adhesive transfer roll 8 and female pattern forming roll 10 disengage.

In the illustrated embodiment, the adhesive separating element 60 is an electrically resistive heating element, such as a NICHROME heating element or wire, that cuts any adhesive strands that may bridge the gap between the adhesive transfer roll 8 and the female pattern forming roll 10 as these rolls disengage. The element 60 is typically heated to a high enough temperature to burn any residual adhesive that may adhere to the element 60 during the cutting process so that adhesive does not accumulate on the element 60. The particular temperature of the element 60 will depend on the adhesive used but will typically be at least about 500° F., and more particularly, at least about 600° F.

A second adhesive separating element 62 may be arranged between the web 4 and the female pattern forming roll 10 to cut any adhesive strands that form between the web 4 and the female pattern forming roll as adhesive is transferred from the female pattern forming roll 10 to the web. The second adhesive separating element 62 may be identical to the first adhesive separating element 60. The second adhesive separating element 62 is arranged adjacent the adhesively coated first major surface 48 of the web 4 as the web 4 exits the male and female pattern forming rolls 12, 10.

Figure 2:
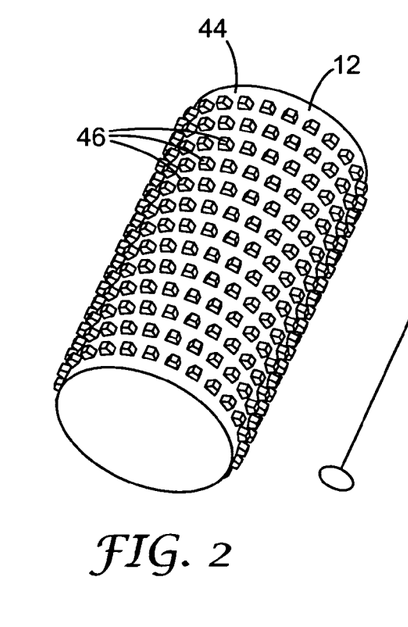
FIG. 2 is a perspective view of the male pattern forming roll of FIG. 1.

The female pattern forming roll 10 rotates counterclockwise as indicated by arrow 40 into intermeshing relation with the male pattern forming roll 12. The male pattern forming roll 12 rotates clockwise as indicated by arrow 42. The outer surface 44 of the male pattern forming roll 12 is provided with a plurality of protrusions 46 that correspond to the recesses 30 contained in the female pattern forming roll 10. Thus, in the illustrated embodiment, the protrusions 46 have a generally frusto-pyramidal shape having a size, shape, and location that allows the protrusions 46 to mate with the corresponding aligned recesses 30.

The web 4 of material to be coated with adhesive is conveyed between the male 12 and female 10 pattern forming rolls. The web 4 includes a first major surface 48 that faces the female pattern forming roll 10 and a second major surface 50 that faces the male pattern forming roll 12. As the web 4 is conveyed between the male 12 and female 10 pattern forming rolls, the protrusions 46 force the web 4 into recesses 30, thereby forming the peaks 52 of the cleaning sheet 54 shown in FIG. 4. Simultaneously, the portion of the web 4 that is not forced into the recesses 30 of the female pattern forming roll 10 is brought into contact with the raised surface region 26 of the female pattern forming roll, thereby transferring adhesive 14 into the area that will become the valleys 56 of the cleaning sheet shown in FIG. 4.

The particular web material is not significant to the invention hereof so long as it has sufficient structural integrity to withstand the physical requirements of the process and is capable of having adhesive transferred to at least one of its surfaces. If the web is to be provided with a contoured topography, the web must also be capable of withstanding the formation of the contoured topography and be capable of retaining the contoured shape indefinitely after it has been created.

The web 4 may be a knitted or woven fabric, or a nonwoven web. The preferred web is a nonwoven web. The nonwoven web can be prepared by any suitable melt forming or mechanical forming operation. For example, the nonwoven web may be carded, spunbonded, spunlaced, melt blown, air laid, creped, or made by other processes known in the art. Preferred webs include nonwoven webs made from one or more of a variety of thermoplastic polymers that are known to form fibers. Suitable thermoplastic polymers can be selected from polyolefins (such as polyethylenes, polypropylenes, and polybutylenes), polyamides (such as nylon 6, nylon 6/6, and nylon 10), polyesters (such as polyethylene terephthalate), copolymers containing acrylic monomers, and blends and copolymers thereof. Semi-synthetic fibers (such as acetate fibers), natural fibers (such as cotton), regenerated fibers (such as rayon), and other non-thermoplastic fibers can also be blended with the thermoplastic fibers. The fibers typically have a denier of from about 1 to about 32, more particularly from about 1 to about 15. The basis weight of the web is preferably from about 10 to about 150 grams per square meter ($g/m^2$), and more particularly from about 20 to about 75 $g/m^2$.

A suitable web 4 material is available from Green Bay Nonwovens, Green Bay, Wis., under the product designation SX-313. This material is a non-apertured spunlace nonwoven comprising 50% polyester fibers and 50% rayon fibers having a denier of 1.5. The material has a basis weight of approximately 50 $g/m^2$.

In addition, the web may include a backing layer (not shown) such as a knitted or woven fabric, a nonwoven web, paper, a plastic film, or laminates thereof. The backing layer may also comprise a net, a scrim, or strands of fiber. The backing layer may be permanently or releaseably connected to the web. When the backing layer is a nonwoven layer or a knitted or woven fabric, it may optionally serve as a second wiping surface. The backing layer is preferably a nonwoven web similar to web described above. The basis weight of the nonwoven backing layer can be within the same ranges described above for the web and preferably have a basis weight greater than about 15 g/m².

If a plastic film is used as the backing layer, a polyolefin (such as polypropylene or polyethylene), a polyamide, a polyester, or other film may be used. The thickness of the film may be from about 0.012 mm (0.5 mils) to about 0.075 mm (3 mils). If the film is extrusion bonded to a nonwoven web, then it is important that the nonwoven web and the film backing layer be of compatible materials so that adequate bonding between the two members is obtained.

To selectively coat the web 4 with pressure-sensitive adhesive 14 and form a cleaning sheet having peaks that are essentially free of adhesive and valleys that contain adhesive, adhesive 14 is applied to the entire outer surface 16 of the adhesive transfer roll 8. The adhesive 14 is applied to the outer surface 16 of the adhesive transfer roll 8 in a narrow stream that is then spread and evenly distributed over the entire outer surface 16 of the adhesive transfer roll 8 by the doctor blade 20 to form a continuous and uniform layer of adhesive having a desired constant thickness.

The outer surface 16 of the adhesive transfer roll 8 is then rotated into contact with the raised surface region 26 of the female pattern forming roll 10, thereby transferring adhesive 14 from the outer surface 16 of the adhesive transfer roll 8 to the raised surface region 26 of the female pattern forming roll 10. The adhesively coated raised surface region 26 of the female pattern forming roll 10 is then rotated into contact with the web 4 at a speed matching the speed of the web 4. In this manner, adhesive from the raised surface region 26 is transferred to specific regions of the web 4.

The amount of adhesive applied to the web will depend on a number of factors including the tackiness of the adhesive and the physical characteristics of the web. The amount of adhesive should be sufficient for the wipe to capture both small and large particles of various shapes and consistencies, such as lint, dust, hair, sand, food particles, dirt, and the like, without having excess adhesive that could create drag and make wiping difficult or that could transfer to the surface being cleaned. The web 4 will typically include from about 2 weight % to about 50 weight % of adhesive, more typically from about 10 weight % to about 20 weight % of adhesive, based on the weight of the input nonwoven web. Also, the planar ratio between areas of the web that have adhesive and those that either have no adhesive may range from about 80:20 to about 20:80.

The adhesive is typically coated onto the web at a minimum weight of about 1 gram/m², more typically at least about 2.5 grams/m², and even more typically at least about 4 grams/m², and at a maximum weight of no more than about 25 grams/m², more typically no more than about 15 gram/m², and even more typically no more than about 8 grams/m².

It will be recognized that the outer surface 44 of the male pattern forming roll 12 may be smooth, thereby producing a generally planar web having a pattern of adhesive. However, because the adhesive on a generally planar web is not "spaced" from the surface to be cleaned and will therefore typically produce a level of drag that interferes with the use of the cleaning sheet, the male pattern forming roll typically includes protrusions 46 that force the uncoated (i.e. adhesive free) regions of the web into the recesses 30 of the female pattern forming roll 8, thereby forming adhesive free peaks 52 that serve to space the adhesively coated valleys 56 from the surface to be cleaned, thereby reducing drag. To form the cleaning sheet 54 (FIG. 4) from the processed web 4, the web 4 is simply cut to the desired size and/or shape.

It will be apparent to those of ordinary skill in the art that various changes and modifications may be made without deviating from the inventive concept set forth above. Thus, the scope of the present invention should not be limited to the features described in this application, but only by the features described by the language of the claims and the equivalents of those features.

What is claimed is:

1. A method of selectively applying adhesive to a sheet, comprising the steps of:
    (a) applying a layer of adhesive to at least a portion of a first roll;
    (b) transferring at least a portion of the adhesive from the first roll to a portion of a second roll, wherein the second roll is a female pattern roll having a raised surface region and a recessed surface region, the raised surface region comprising a continually interconnected surface;
    (c) cutting any adhesive strands that form as a result of the adhesive being transferred from the first roll to the second roll; and
    (d) transferring at least a portion of the adhesive from the second roll to the sheet.

2. A method of applying adhesive to a sheet as defined in claim 1, further comprising the step of separating the adhesive between the second roll and the sheet.

3. A method of applying adhesive to a sheet as defined in claim 1, wherein the method comprises selectively applying adhesive to recessed regions of the sheet.

4. A method of applying adhesive to a sheet as defined in claim 1, wherein the adhesive is a pressure-sensitive adhesive.

5. A method of applying adhesive to a sheet as defined in claim 4, wherein the pressure-sensitive adhesive is an acrylate adhesive.

6. A method of applying adhesive to a sheet as defined in claim 1, wherein the adhesive is applied to the outer surface of the first roll in an elongated bead.

7. A method of applying adhesive to a sheet as defined in claim 6, further comprising the step of spreading the bead of pressure-sensitive adhesive over the entire outer surface of the first roll to a constant thickness ranging from of about 1 to about 7 mils.

8. A method of applying adhesive to a sheet as defined in claim 7, wherein the adhesive is spread using a blade arranged adjacent the outer surface of the first roll.

9. A method of applying adhesive to a sheet as defined in claim 7, wherein the adhesive is transferred from the first roll to the second roll by contacting the first roll with the second roll.

10. A method of applying adhesive to a sheet as defined in claim 1, wherein the recessed surface region comprises a plurality of discrete depressions separated by the raised surface region.

11. A method of applying adhesive to a sheet as defined in claim 10, wherein the pressure-sensitive adhesive is transferred to only the raised surface region of the female pattern forming roll and the recessed surface region remains essentially adhesive free.

12. A method of applying adhesive to a sheet as defined in claim 11, wherein the first roll and female pattern forming roll are heated to a temperature of at least 200° F.

13. A method of applying adhesive to a sheet as defined in claim 12, wherein the pressure-sensitive adhesive applied to the first roll has a viscosity of no greater than about 200,000 centipoise.

14. A method of applying adhesive to a sheet as defined in claim 1, wherein the sheet is a nonwoven web.

15. A method of applying adhesive to a sheet as defined in claim 14, wherein the web is a spunlace web formed of polyester and rayon fibers.

16. A method of applying adhesive to a sheet as defined in claim 1, further comprising the step of providing a male pattern forming roll adjacent the female pattern forming roll having protrusions that mate with the recesses of female pattern forming roll.

17. A method of applying adhesive to a sheet as defined in claim 16, wherein the sheet is conveyed between the male and female pattern forming rolls at a speed corresponding to the speed of the male and female pattern forming rolls, thereby forming a contoured sheet having peaks essentially free of adhesive and valleys having adhesive coated therein.

18. A method of applying adhesive to a sheet as defined in claim 17, wherein the adhesive is coated on the sheet at a weight of about 1 to about 12 grams/m$^2$.

19. A method of applying adhesive to a sheet as defined in claim 16, wherein the recesses of the female pattern forming roll have a depth of about 1 to about 4 millimeters.

20. A method of applying adhesive to a sheet as defined in claim 16, wherein the distance between the centers of adjacent protrusions of the male pattern forming roll ranges from about 5 millimeters to about 20 millimeters.

21. A method of applying adhesive to a sheet as defined in claim 1, wherein the surface area of the raised surface region comprises at least about 50% of the total outer surface area of the female pattern forming roll.

22. A method of applying adhesive to a sheet as defined in claim 21, wherein the raised surface region is in the form of a continuous rectilinear array.

23. A method of applying adhesive to a sheet as defined in claim 17, wherein the sheet is conveyed between the male and female pattern forming rollers at a speed of at least about 25 feet/minute.

24. A method of applying adhesive to a sheet as defined in claim 1, wherein the adhesive between the first and second rolls is separated by a heated wire.

25. A method of applying adhesive to a sheet as defined in claim 24, wherein the wire is heated to a temperature of at least about 500° F.

26. A continuous process for selectively applying pressure-sensitive adhesive to specific recessed regions of a nonwoven web, comprising the steps of:
   (a) applying an elongated bead of pressure-sensitive adhesive to the outer surface of a rotating adhesive transfer roll;
   (b) spreading the pressure-sensitive adhesive to substantially evenly distribute the pressure-sensitive adhesive on the outer surface of the adhesive transfer roll, thereby forming a substantially continuous and uniform layer of adhesive having a substantially constant thickness on the outer surface of the adhesive transfer roll;
   (c) rotating the adhesively coated outer surface of the adhesive transfer roll into contact with a female pattern forming roll having raised surface regions and recessed surface regions, the raised surface region comprising a continually interconnected surface, thereby to transfer adhesive from the adhesively coated outer surface of the adhesive transfer roll to the raised surface regions of the female pattern forming roll without transferring adhesive to the bottom of the recessed surface regions; and
   (d) providing an adhesive separating element to break any adhesive strands that form as a result of the adhesive being transferred from the adhesive transfer roll to the female pattern forming roll.

27. A process as defined in claim 26, further comprising the steps of:
   (a) rotating the adhesively coated raised surface regions of the female pattern forming roll to mesh with a mating male pattern forming roll;
   (b) conveying a generally planar nonwoven web of material between the male and female pattern forming rolls, thereby simultaneously forming a contoured web having peaks and valleys and transferring adhesive to the valleys without transferring adhesive to the peaks; and
   (c) providing an adhesive separating element to break any adhesive strands extending between the web and the female pattern forming roll.

* * * * *

UNITED STATES PATENT AND TRADEMARK OFFICE
CERTIFICATE OF CORRECTION

PATENT NO. : 7,291,359 B2
APPLICATION NO. : 10/920953
DATED : November 6, 2007
INVENTOR(S) : Thomas E. Haskett Page 1 of 1

It is certified that error appears in the above-identified patent and that said Letters Patent is hereby corrected as shown below:

*Column 7
Line 14, Before "i.e." delete "(".

Column 10
Line 20, In Claim 1, after "pattern" insert -- forming --.

Signed and Sealed this

First Day of April, 2008

JON W. DUDAS
*Director of the United States Patent and Trademark Office*